United States Patent
Lewis

[11] Patent Number: 5,480,331
[45] Date of Patent: Jan. 2, 1996

[54] FLEXIBLE SURFBOARD FIN

[75] Inventor: Tommy R. Lewis, Olivenhain, Calif.

[73] Assignee: John R. Nickel, Cardiff, Calif.

[21] Appl. No.: 425,034

[22] Filed: Apr. 17, 1995

[51] Int. Cl.$^6$ ............................................. B63B 1/00
[52] U.S. Cl. ................................. 441/79; 114/127
[58] Field of Search ........................... 114/126, 127, 114/140; 441/74, 79

[56]  References Cited

U.S. PATENT DOCUMENTS 5,032,096 7/1991 Scott et al. ........................... 441/74
5,242,322 9/1993 Chellemi et al. ...................... 441/79
5,273,472 12/1993 Skedeleski et al. ................... 441/79

*Primary Examiner*—Jesus D. Sotelo
*Attorney, Agent, or Firm*—Henri J. A. Charmasson; John D. Buchaca

[57]  ABSTRACT

A flexible fin for surfboards, sailboards and other watercraft comprises a thin core sheet made of laminated fiberglass sandwiched between two slabs of closed-cell polyurethane foam. The flexible fin provides for sharper turns while increasing the buoyancy of the craft.

8 Claims, 1 Drawing Sheet

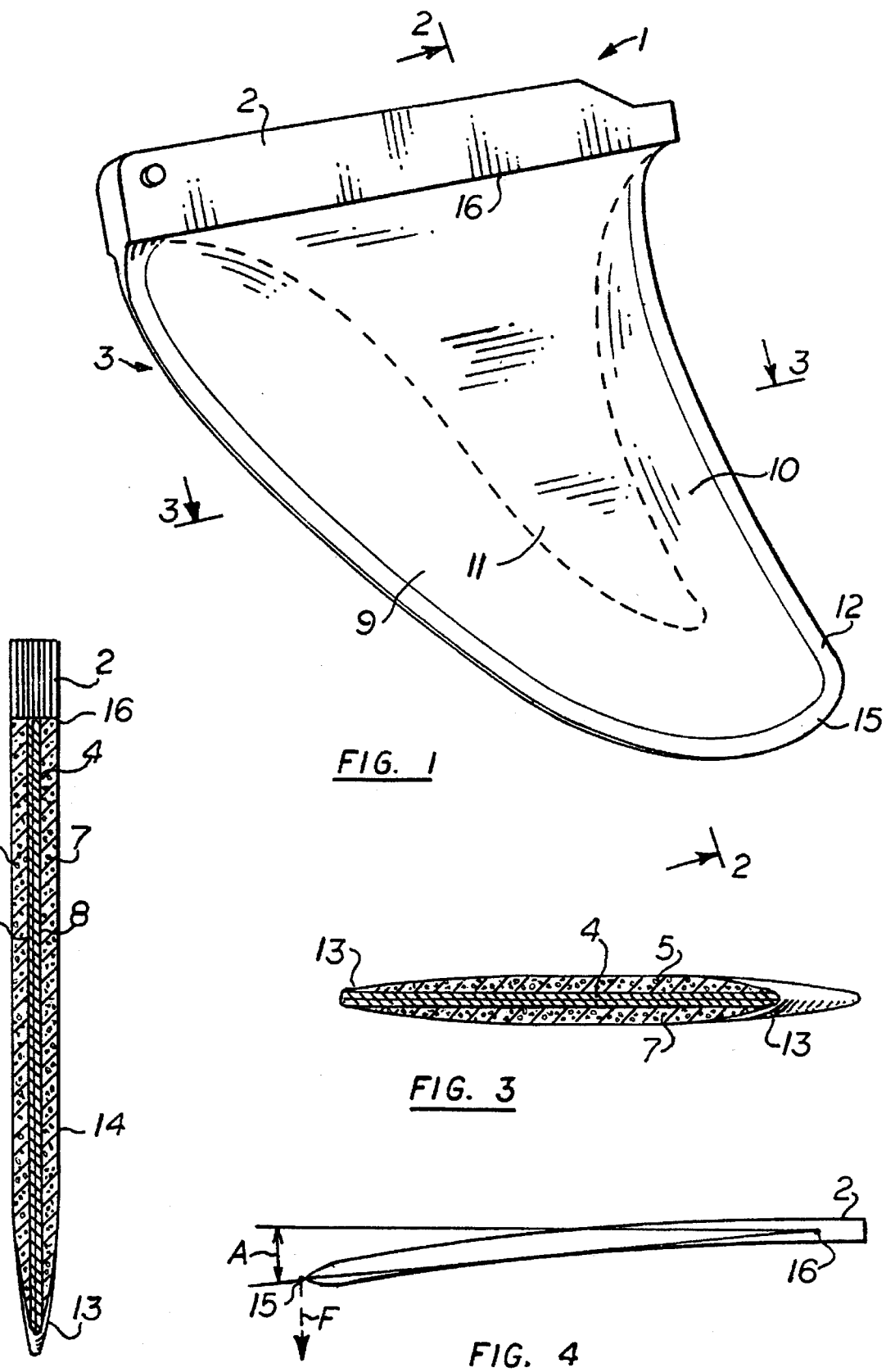

FLEXIBLE SURFBOARD FIN

FIELD OF THE INVENTION

This invention relates to the design of watercraft, and more specifically to fins and keels used in connection with boats, submarines, catamarans, surfboards, sailboards, body boards, water boards, water scooters and other fully or partially submerged crafts.

BACKGROUND OF THE INVENTION

The principal function of fins and keels is to regulate and stabilize the course of a craft as it slices through water against lateral wind forces and water currents. During a tacking maneuver or change of course, a fin tends to counteract the effect of the rudder or other turning forces. The number, shape and size of fins must therefore be tuned to the other characteristics of the craft in order to achieve a satisfactory compromise between stability and maneuverability.

The invention results from an attempt to maximize the stabilizing property of a fin without impairing, but rather improving the maneuverability of the craft.

Fins and keels must have a strong longitudinal rigidity. Consequently they are made of solid material having no buoyancy and tend to increase the weight of the craft to which they are appended. The invention also results from efforts to reduce the weight and increase the buoyancy of such appendages.

SUMMARY OF THE INVENTION

Borrowing from nature, the invention applies the concept of flexible fins and flukes found in fish and cetaceans to fins and keels used in small crafts, particularly to fins used in surfboards and sailboards.

By allowing a certain degree of flexibility and compressibility in a fin, while maintaining its longitudinal rigidity, a greater degree of maneuverability and speed can be achieved.

For example, at the beginning of a surfboard turn, the flexible fin tends to bend outwardly absorbing part of the turning forces applied by the rider. At the same time, this bending lessens the amount of force necessary to overcome the lateral pressure imposed by the surrounding water mass. As the angle of turn is reduced in the latter phase of the turn and the outward directed forces decrease, the flexible fin kicks back toward, and even beyond its rest position. This resilient movement of the fin releases the energy stored within it to accentuate and prolong the turning forces. Accordingly, the rider, taking advantage of the above-described phenomenon, needs only to apply a strong and short turning force to the craft at the beginning of the turn when he stands in a relatively stable position. Once the turning sequence has begun, the rider can let the fin take over and kick-in the final turning forces. This takes place at a time when he stands in a less stable stance and is less able to apply the required turning effort. With proper timing, the invention allows for sharper and faster turns.

The above-described features, lesser weight and higher buoyancy are achieved by a fin having a thin core of laminated material on each side of which has been added a feathered slab of compressible but closed-cell synthetic foam or other resiliently compressible buoyant material.

BRIEF DESCRIPTION OF THE DRAWINGS

FIG. 1 is a perspective view of a surfboard fin according to the invention;

FIG. 2 is a cross-sectional view taken along line 2—2 of FIG. 1;

FIG. 3 is a cross-sectional view taken along line 3—3 of FIG. 1; and

FIG. 4 is a diagrammatical illustration of the fin flexibility.

Description of the Preferred Embodiment of the Invention

Referring now to the drawing, there is shown a fin 1, particularly adapted for use on a surfboard or sailboard, which has a typical height or length of 15 centimeters (6 inches) and a width at its root of typically 11 centimeters (4.5 inches). The fin has a mounting side or top 2 shaped and dimensioned to be installed within an appropriate mounting sleeve. The remaining part of the fin forms a roughly triangular foil 3. The foil comprises a core sheet 4 made from 5 to 12 plies of fiberglass laminated together to a thickness of 1 to 4 millimeters (40–160 mils). A eight-ply core sheet of 2.5 millimeters (100 mils) is preferably selected for the given dimensions; it being understood that a larger fin may accommodate a thicker core sheet and vice versa.

A first slab 5 of resiliently compressible synthetic foam material preferably a closed-cell polyurethane foam is bonded to the right face 6 of the core sheet. A second slab 7 similar and symmetrical to the first slab 5 is bonded to the left face 8 of the core sheet. The fore and aft edges 9, 10 of each slab are feathered or tapered down from a central section 11 shown in broken line in FIG. 1 toward the matching peripheral edges of the core sheet. The central section 11 is substantially flat or may have a slightly arculate surface.

A marginal area 12 along the fore and aft edges of the foil is capped by a strip of fiberglass material 13 which extends over and protects the edges of the slabs 5, 7. The maximum thickness of each slab can vary between 5 to 10 millimeters (200–400 mils). A thin, flexible layer 14 of fiberglass material may be applied over the exposed surface of the foam slabs, or they may be left exposed. It should be understood that the slabs 5, 7 could be made of any resiliently compressible and flexible buoyant material or replaced by inflated bladders each havaing one face bonded to one side 5,8 of the core sheet.

As a general rule, the number of plies and thickness of the core sheet 4 should be adjusted to allow an average lateral flexion A of 1 to 5 degrees from the rest position over the length of the foil when it is subject to a lateral differential force F between the tip 15 and the root 16 of the foil of 5 kilograms (11 lbs) as illustrated in FIG. 4. In general, the size of the fin, and the thickness and radii of curvature of the foam pads should be adjusted according to the other characteristics of the craft and desired performances. It should be understood that both the flexibility of the foil and its lateral compressibility contribute to the improved maneuverability. Moreover, the use of foam pads reduces the weight of the fin compared to ordinary fins of the same shape and dimensions, and increases its buoyancy.

While the preferred embodiments of the invention have been described, modifications can be made and other embodiments may be devised without departing from the spirit of the invention and the scope of the appended claims.

What is claimed is:

1. A resiliently flexible fin or keel for use on watercraft which comprises:

a flat core sheet having limited lateral resilient flexibility, said sheet having a right face and a left face, said core sheet being limited by a mounting side and a peripheral edge extending from fore to aft;

a first slab of resiliently compressible material bonded to said right face; and a second slab of resiliently compressible foam material symmetrical to said first slab bonded to said left face.

2. The structure of claim 1, wherein each of said slabs comprises a section tapering down from a central area toward said peripheral edge.

3. The structure of claim 2, wherein said core sheet comprises a plurality of longitudinal plies laminated together.

4. The structure of claim 3, wherein each slab comprises a close-cell synthetic foam material.

5. The structure of claim 3, which further comprises a strip of solid material capping said peripheral edge and a marginal portion of said tapering sections.

6. The structure of claim 5, wherein said plies are made of fiberglass.

7. The structure of claim 6, wherein said strip of solid material is made of fiberglass.

8. The structure of claim 3, wherein said core sheet has the general shape of a triangle having said mounting side as a base and a distal tip as apex; and said core sheet has an average flexion of 1 to 5 degrees when a differential force of 5 kilograms is applied between said mounting side and said tip.

* * * * *